UNITED STATES PATENT OFFICE.

RICHARD BRASCH, OF HÖCHST-ON-THE-MAIN, GERMANY, ASSIGNOR TO THE FARBWERKE, VORMALS MEISTER, LUCIUS & BRÜNING, OF SAME PLACE.

ALIZARIN DYE AND METHOD OF MAKING SAME.

SPECIFICATION forming part of Letters Patent No. 569,404, dated October 13, 1896.

Application filed January 11, 1895. Serial No. 534,574. (Specimens.)

*To all whom it may concern:*

Be it known that I, RICHARD BRASCH, a citizen of the Empire of Germany, and a resident of Höchst-on-the-Main, in the Empire of Germany, have invented certain new and useful Improvements in the Production of Claret-Red Coloring-Matters from the Alizarin Coloring-Matter of Commerce, of which the following is a specification.

The only alpha-nitro compound of the alizarins known up to date was the alpha-nitroalizarin, $(OH.OH.N.O_2-1:2:4.)$ This compound was produced by Perkin in the year 1876 by nitrating diacetyl alizarin with a mixture of nitric acid and fuming sulfuric acid. (*Journal of the Chemical Society*, 1876.) Perkin had recognized the technical importance of this nitroalizarin, but up to date a good method for producing it was wanting, as Perkin's method when worked with the greatest precautions does give satisfactory yields, but only in case very small quantities are worked with. I have discovered a novel process consisting in nitrating benzoylized alizarins by means of nitrosulfuric acid, by which method the production of the alpha-nitro compound of alizarin, flavo, and anthrapurpurin, which latter bodies exhibit a very similar behavior to alizarin proper, is carried out quite easily. Working by the process in question it is possible, therefore, to use the alizarin of commerce. By "alizarin of commerce" is understood the alizarin proper (dioxyanthraquinone) or flavopurpurin or anthrapurpurin or mixtures in varying proportions of two or three of these bodies.

The benzoylized alizarins treated with a mixture of nitric and sulfuric acids are quite smoothly nitrated, whereas the diacetyl alizarins on being treated in this way are saponified and oxidized at the same time. In the nitrating it is not necessary to use a benzoylized alizarin in free state. It does as well to use the crude product, such as it is obtained by heating for one hour equal quantities by weight of alizarin and of benzoyl chlorid at 180° centigrade. The three benzoylized alizarins (*vide Beilstein, Handb. der org. Chemie*, II edit., pp. 222, 236, and 237) are but little different in quality. All three are yellow colored and dissolve easily in caustic alkali under saponification with the shade of the respective alizarin. At ordinary temperature carbonates have scarcely any action upon the same. At higher temperature their action is a more quick one and produces saponification.

The nitrating is carried out, for example, in the following manner: Six parts of benzoyl alizarin in fine powder are introduced while stirring, and in such a manner that the temperature never rises above 5° centigrade, into a mixture of eleven parts of nitric acid of 43° Baumé and sixteen parts of sulfuric acid of 66° Baumé, cooled by ice and salt. After standing for several hours the mass is heated to from 20° to 30° centigrade. The alizarin dissolves but sparingly in the nitrosulfuric acid. Nevertheless it is in most cases completely nitrated after standing for about twenty-four hours. This can be ascertained also by spectroscopic examination. The nitration product, which as yet is benzoylized, is obtained by pouring into water and filtering. It is soluble and of a somewhat lighter yellow color than the benzoylized raw material from which it has been produced, and in contradistinction to the latter product it is saponified by a diluted solution of carbonate of sodium under separation of the free nitro body at the ordinary temperature.

The qualities of the alpha-nitroalizarin are given in the *Journal of the Chemical Society*, London, 1876, p. 578, whereas the alpha-nitroflavopurpurin and anthrapurpurin have become known by the German patent, No. 67,470, of 1892. The color of the nitroflavopurpurin is a reddish yellow; that of the alpha-nitroanthrapurpurin a brownish yellow. Both nitro bodies do not have a strict melting-point. Heated above 200° centigrade gradual softening sets in and they assume a dark coloring. They are soluble to some extent in glacial acetic acid and alcohol, and may be obtained from these solvents in the form of small crystals. Their color reactions in comparison to those of the alpha-nitroalizarin are given in the following table:

| Dissolved in — | Alpha-nitro-alizarin. | Alpha-nitroanthrapurpurin. | Alpha-nitroflavopurpurin. |
|---|---|---|---|
| Concentrated sulfuric acid. | Red-yellow.. | Currant-red. | Yellowish red. |
| An excess of ammoniacal liquid. | Red violet .. | Carmine-red. | Red-orange. |
| An excess of caustic soda. | Violet .. .... | Red-violet | Carmine. |
| Caustic soda in presence of an excess of nitro body. | Currant-red. | Currant-red. | Red-orange. |
| An excess of soda solution. | Currant-red | Claret-red. | Currant-red. |
| The calcium lake is....... | Brownish-red orange. | Dull-red orange | Dull orange. |
| The aluminium lake is .. | Brown-violet. | Yellow-brown. | Brown-red. |
| The chrome lake is...... | Reddish violet. | Carmine .. | Red-orange. |

The calcium, aluminium, and chrome lakes mentioned in the table are acid salts. They are obtained from the acid sodium salt in presence of an excess of a nitro body by double decomposition. Acetic, oxalic, and phosphoric salts of the alkalies in aqueous solution are easily decomposed, especially on being heated, on addition of an organic solvent, such as alcohol, instantaneously, even at the ordinary temperature, forming the acid color salts. On aluminium mordants the alpha-nitroanthra and flavo purpurin dye shades ranging between the shades produced by the corresponding beta-nitro compounds and those produced by the anthra resp.-flavo purpurin themselves. The alpha-nitroflavo purpurin dyes aluminium mordanted goods yellower shades than the alpha-nitroalizarin, but redder shades than the alpha-nitroanthrapurpurin.

The alpha-nitroalizarin hereinbefore described can easily be reduced in the usual manner into the alpha-amido compounds.

For example: One part of the nitro body is dissolved in an excess of diluted caustic soda, a solution of one and one-half parts of crystallized tin chlorid added, and heated to boil. When the reaction is complete, the amido body is precipitated by means of diluted acid and isolated by filtering. The properties of the alpha-amido compounds of the three alizarins are very nearly the same and are those of the alpha-amidoalizarin, as given by Perkin, (*loc. cit.*)

The alpha-amido-anthrapurpurin has a dark brown-red color, the alpha-amidoflavopurpurin a somewhat lighter red-brown color. The color of the solutions in alkalies is blue-red to yellow-red, and also in this condition the flavopurpurin compounds are colored more yellowish than the anthrapurpurin compounds. With concentrated hydrochloric acid both amido bodies form brownish yellow nearly insoluble salts that are already decomposed by a small quantity of water. In concentrated sulfuric acid the amido-anthrapurpurin dissolves with reddish color, the amido-flavopurpurin with yellowish color. Aluminium mordanted goods are dyed pretty claret-red, completely fast shades, such as formerly could not be produced with other alizarin coloring-matters.

What I claim as my invention is—

1. The process for the manufacture of alizarin coloring-matters dyeing claret-red shades from the alizarin of commerce, which consists in converting the alizarin by heating with benzoyl-chlorid into benzoyl-alizarin, nitrating the product at ordinary temperature with nitrosulfuric acid, separating the benzoylized alpha-nitroalizarin by pouring it into water, saponifying it by means of soda-lye and reducing it into the amido compound by means of reducing agents, such as zinc, substantially as set forth.

2. As a new article of manufacture alpha-amido-flavo and anthra purpurin, insoluble in water difficultly soluble in alcohol, ether and benzene having the formula:

$$C_6H_3(OH)=(CO)_2=C_6H(OH)_2.NH_2$$

and dyeing mordanted wool and cotton claret-red shades.

In testimony that I claim the foregoing as my invention I have signed my name in presence of two subscribing witnesses.

RICHARD BRASCH.

Witnesses:
HEINRICH HAHN,
BERNHARD LEYDECKER.